UNITED STATES PATENT OFFICE.

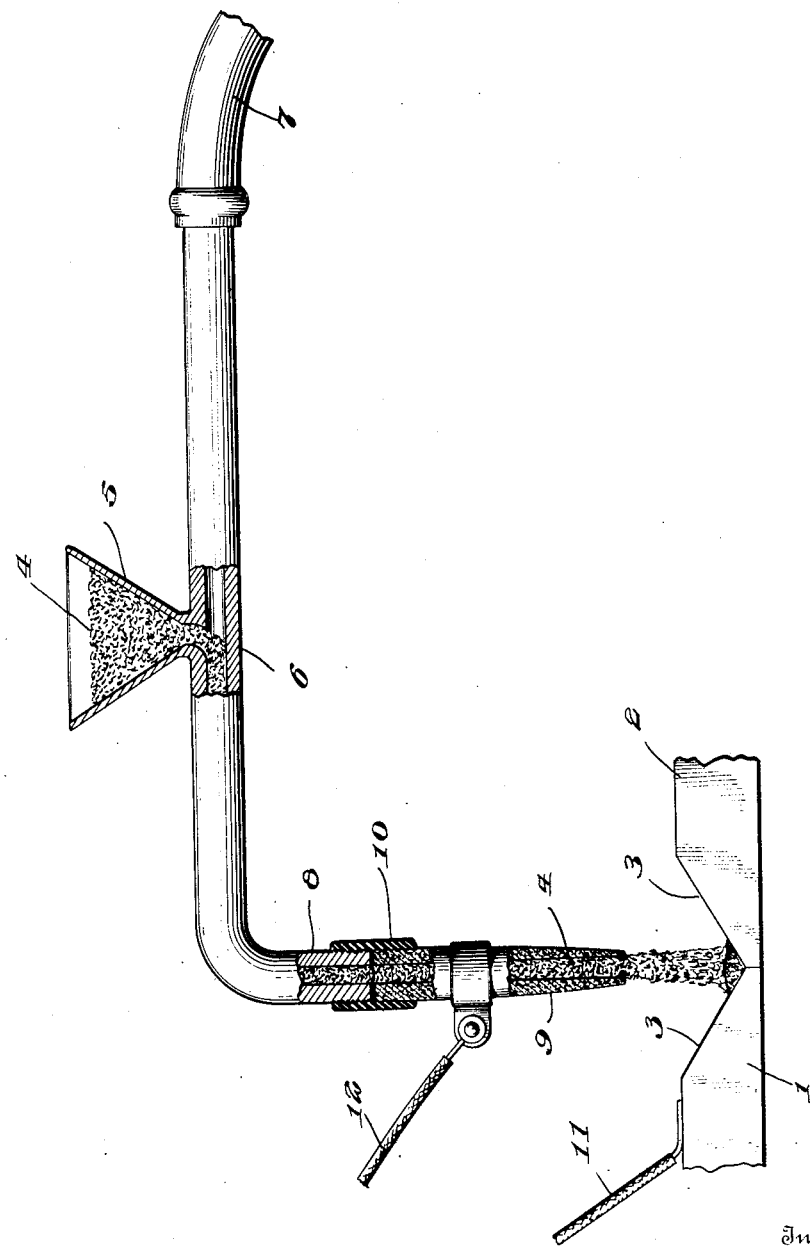

SYLVAN W. WOHLRAB, OF MAPLE FALLS, WASHINGTON.

PROCESS OF WELDING METALS.

1,161,366.  Specification of Letters Patent.  Patented Nov. 23, 1915.

Application filed April 3, 1915. Serial No. 18,998.

*To all whom it may concern:*

Be it known that I, SYLVAN W. WOHLRAB, a citizen of the United States, residing at Maple Falls, in the county of Whatcom and State of Washington, have invented new and useful Improvements in Processes of Welding Metals, of which the following is a specification.

This invention relates to a process of welding metals, and particularly to a process of welding by electric heat, through the medium of an electric arc.

The object of the invention is to provide a process of welding pieces of metals together in a rapid, simple, economical and durable manner, by feeding a column of finely divided particles of metal toward the metallic surfaces to be joined, and fusing the same by means of an electric arc passing therethrough, by which the particles of metal will be fused at the instant of deposit to solidly bind the parts to be joined together.

A further object of the invention is to provide a process of the character described wherein the particles of metal are fed into the heating zone by the pressure of a non-oxidizing gas, whereby the oxidation of the metal when in fluid state will be prevented.

The accompanying drawing shows in elevation, partly in section, an apparatus which may be employed for carrying my invention into practical effect, and illustrates the mode of employing the same.

In carrying my invention into practice, the metallic elements 1 and 2 which are to be joined are placed with their surfaces to be joined in proximity to each other, and these surfaces are cut away at an angle, as shown at 3, to provide a substantially V-shape chamber or recess, to receive the metal whereby the elements 1 and 2 are welded together.

The fusible metal 4 employed as the welding or binding medium may be of suitable character, and is employed in a finely divided condition. The supply of metal is placed in a hopper or receptacle 5, communicating at its lower or outlet end with a horizontal conductor 6, substantially at a point midway between the ends of the latter. With one (the receiving) end of this conductor is connected a pipe or tube 7 for supplying a non-oxidizing gas under pressure, while from the opposite or delivery end of said pipe 6 depends a vertical discharge branch 8 terminating in a discharge nozzle 9. This discharge nozzle 9 consists of a tubular body of carbon or other equivalent material, connected with the branch 8 by an insulating coupling 10.

The carbon discharge tube or nozzle 9 is disposed in practice immediately above the center of the space or chamber formed by the beveled surfaces 3 of the parts 1 and 2 to be joined, so that the divided metallic particles flowing by gravity into the pipe 6 from the hopper 5 will be fed in the form of a column or stream by the pressure of the non-oxidizing gas through the branch 8 and nozzle 9, whereby a stream of the metallic particles will be projected into the said chamber or recess through the space or air gap between the same and the nozzle 9. In practice, the metallic parts 1 and 2 and the nozzle 9 are respectively connected by conductors 11 and 12 with the opposite poles of a battery or other source of electric energy, so that the metallic particles and carbon will form opposing electrodes spaced to provide a gap through which the current arcs from one to the other.

It will thus be understood that when the apparatus is set into operation the current passing from the carbon nozzle or electrode 9 toward the chamber or recess between the surfaces of the electrode formed by the parts 1 and 2 will pass through the stream of finely divided metal particles extending between the electrodes across the gap, thereby causing the same to be melted and deposited in a solid mass into the said space or recess so as to fill up the same and weld the adjacent surfaces of the elements 1 and 2 together. By the use of a gaseous fluid pressure feed medium which will not cause or will prevent oxidation of the finely divided particles of metal, when fusing, the production of scale is prevented and the particles caused to fuse in a solid, homogeneous mass, whereby the strength and durability of the joint is greatly increased.

Inasmuch as some metals, even in a heated state, resist oxidation, it will of course be understood that a gas may be used of a character which will not cause the heated particles to undergo a chemical change, and such a gas is held to fall within the scope of a "non-oxidizing" gas. The process, in addition to welding, is also useful for welding and coating conducting surfaces with metals.

I claim:—

1. The herein described process of welding metals which consists in feeding a body of finely divided metal under pressure of a non-oxidizing gas toward the surfaces to be joined and through an intervening electric arc, whereby the metallic particles are fused in the presence of such gas.

2. The herein described process of electrically welding metals, which consists in disposing a carbon nozzle and the metals to be joined to form the terminals of an electric circuit separated by an air gap, and feeding under the pressure of a non-oxidizing gas through said carbon nozzle and across said gap a column of finely divided metal, through which the electric current arcs whereby the metal particles are fused in the presence of such gas.

In testimony whereof I affix my signature in presence of two witnesses.

SYLVAN W. WOHLRAB.

Witnesses:
 FRANK McCALL,
 H. J. STRICKFADEN.